United States Patent [19]

Rueger

[11] Patent Number: 4,474,320
[45] Date of Patent: Oct. 2, 1984

[54] AIR BEARING FOR TAPE DRIVES
[75] Inventor: William J. Rueger, Fort Lauderdale, Fla.
[73] Assignee: International Business Machines Corp., Armonk, N.Y.
[21] Appl. No.: 478,761
[22] Filed: Mar. 25, 1983
[51] Int. Cl.³ .............................................. B65H 17/32
[52] U.S. Cl. ............................................. 226/97; 226/7
[58] Field of Search ................... 226/95, 97, 194, 196, 226/50; 474/188, 189; 242/76

[56] References Cited

U.S. PATENT DOCUMENTS

| | | | |
|---|---|---|---|
| 1,430,752 | 10/1922 | Plaisted | 474/189 |
| 3,110,431 | 11/1963 | Potter et al. | 226/95 |
| 3,122,295 | 2/1964 | Davison et al. | 226/50 |
| 3,984,039 | 10/1976 | Hawley et al. | 226/97 |

OTHER PUBLICATIONS

IBM Technical Disclosure Bulletin, vol. 16, No. 11, Apr. 1974, Helical Compliant Guide, pp. 3494, P. J. Arsencault et al.

Primary Examiner—Leonard D. Christian
Attorney, Agent, or Firm—Pollock, Vande Sande & Priddy

[57] ABSTRACT

An air bearing for forming an air cushion with a tensioned medium between first and second flanges located on opposite ends of a cylindrical surface. The cylindrical surface includes a plurality of air emitting apertures for forming an air interface with the tensioned medium. The flanges and cylindrical surface include an undercut which serves to reduce the formation of seals by the edges of the tape medium with the cylindrical surface.

3 Claims, 6 Drawing Figures

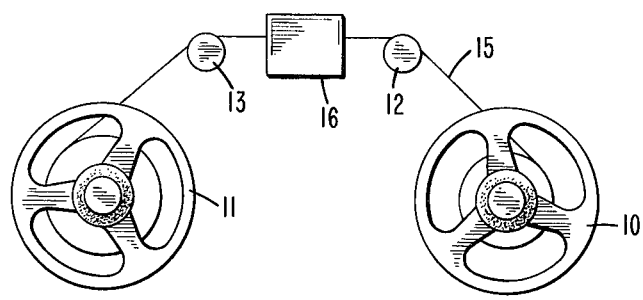
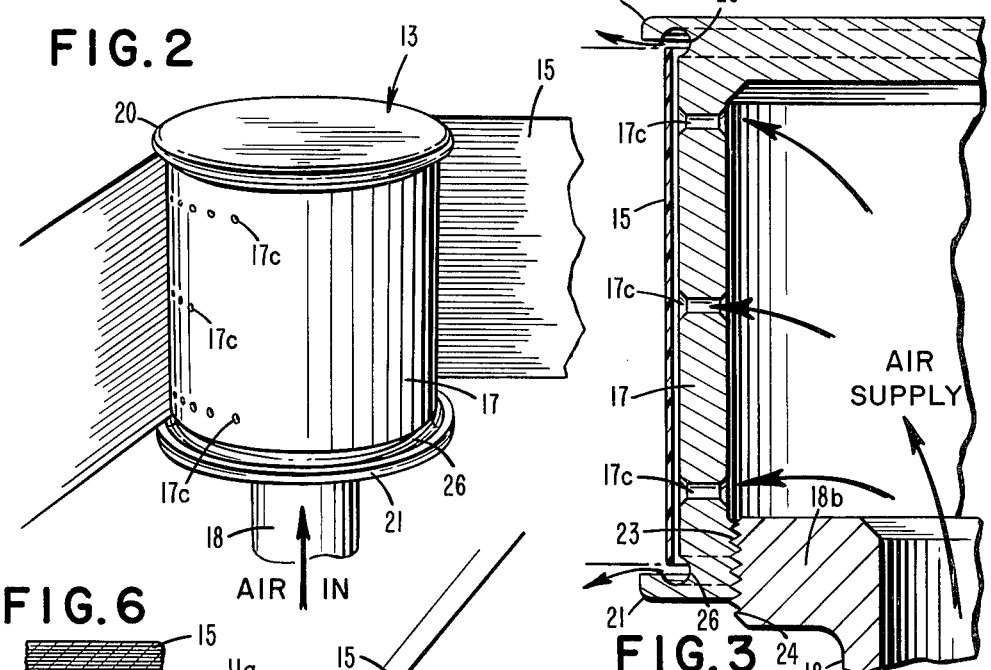
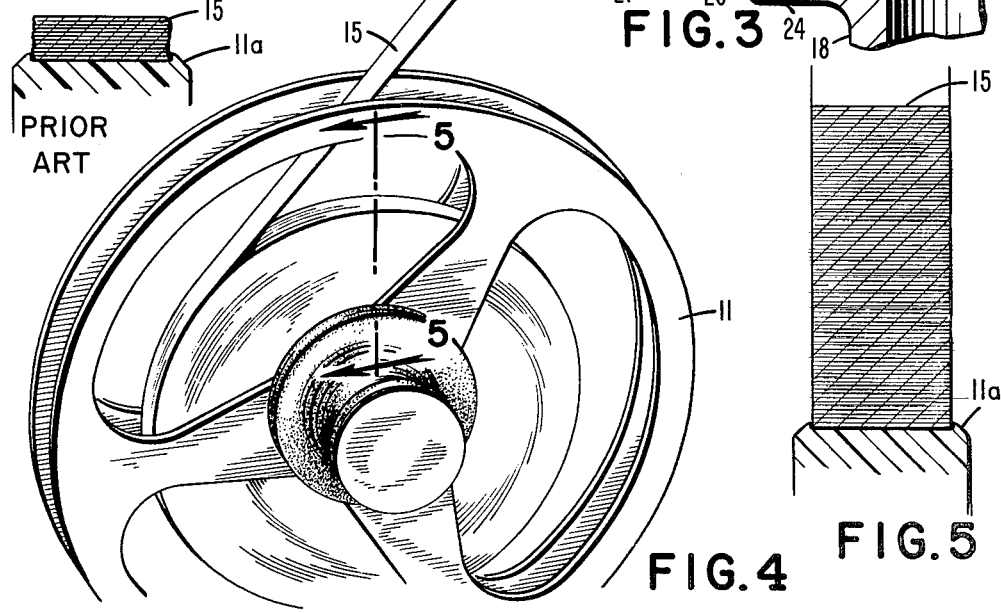

AIR BEARING FOR TAPE DRIVES

BACKGROUND OF INVENTION

The present invention relates to data processing tape drive apparatus. Specifically, a new air bearing is provided which avoids during accelerations and decelerations of the tape medium the formation of an air seal between the tape medium and the bearing surfaces.

Large scale data processing systems have, in the past, utilized magnetic tape as a data storage medium wherein the tape is wound and rewound between reels. The tape medium is guided into and out of a READ, WRITE head by bearings which, in the past, have provided an interface of forced air with the tape medium to lower friction forces and permit rapid acceleration and deceleration of the tape medium. The pressurized air bearings provide for a change in direction of the magnetic tape while avoiding contact between the bearing and tape.

Although air bearings have proven to be advantageous in high speed data processing tape transports, problems arise during rapid acceleration and deceleration of the tape medium. The tape medium edges have been known to form a seal with the air bearing surface. A change in air pressure and flow at the bearing surface results from the seal. The release of the air seal will cause a fluttering of the tape medium which will be conducted through the tape to other areas of the tape transport. Further, the tape being wound on the reel will form layers with uneven edges, interfering with subsequent payout of the tape during a direction of movement reversal common in start-stop operations.

The air bearings used in the prior art also permit oscillations to occur under stationary tape conditions if the tape bumps against the bearing surface. The air pressure increases and is released over the edge of the tape, causing the tape to vibrate or flutter, transmitting the vibration to other portions of the machine.

In view of the foregoing, an improvement to air bearings according to the present invention has been devised.

SUMMARY OF THE INVENTION

It is a primary object of this invention to provide an improved air bearing which facilitates the wrapping of a flexible media on a takeup reel.

It is a more specific object of this invention to avoid tape layer stagger on a takeup reel in a magnetic tape recording system.

These and other objects of the invention are provided with an air bearing in accordance with the invention. An air bearing including a cylindrical member terminated with upper and lower flanges for guiding a web or tape medium supports the medium for motion. An air column is introduced along the inner circumference of the cylinder. A plurality of apertures along the circumference of the cylinder issue a stream of air against the moving medium as the medium is tensioned. Means are provided at the interface of the medium edges and the bearing flanges to release air which supports the medium thereby avoiding any seal which may occur at the medium edges.

In a preferred embodiment of the invention, the means includes a first and second recess at the intersection of the flanges and cylinder surface. The recess is in the form of an undercut having a circular cross-section which intersects both a flange and the cylindrical surface. Air issuing from the bearing surface travels between the medium surface and the cylinder surface to the first and second undercuts. As a result of permitting the air to escape over the lateral edges of the tape through the undercuts, an even wrap is obtained on the takeup reel. Incidental tape fluttering because of an edge seal with the bearing surface is also reduced.

DESCRIPTION OF THE FIGURES

FIG. 1 is an illustration of the use of an air bearing in a reel to reel magnetic tape system.

FIG. 2 is an enlarged view of the air bearing of a preferred embodiment of the invention and the supported magnetic tape medium.

FIG. 3 is a sectional view of an air bearing of a preferred embodiment.

FIG. 4 is an enlarged view of a takeup reel of the preferred embodiment.

FIG. 5 is a sectional view along lines 5—5 of FIG. 4 of the tape layers obtained with the preferred embodiment.

FIG. 6 is a sectional view along lines 5—5 of FIG. 4 of the tape layers obtained with prior art air bearing structures.

DESCRIPTION OF THE PREFERRED EMBODIMENT

Referring now to FIG. 1, there is shown a tape deck for supporting a tape supply reel 10 and takeup reel 11. Two bearings 12 and 13 serve as guides for the tape medium 15. A head assembly 16 for reading and writing data on the tape medium 15 is provided between bearings 12 and 13.

An enlarged view of bearing 13 is shown in FIG. 2. The bearing 13 is an air bearing which comprises a cylindrical section 17 which includes a plurality of apertures 17c which exist in three distinct rows traversing only a portion of the circumferential surface. The tape medium 15 is supported by an air stream issuing from apertures 17c as it changes direction about the circumference of cylinder 17. The air stream results from a source of pressurized air connected to inlet conduit 18.

Referring now to FIG. 3, there is shown a sectional view of the air bearing 13. Inlet 18 connects a supply of air to the interior of cylindrical surface 13. Cylinder 13 includes at first and second ends flanges 20 and 21. Flanges 20, 21 are integral with the cylinder 17. An inner thread 23 of cylinder 17 engages outer thread on a flange 18b inlet conduit 18. Thus, when screwed together as shown in FIG. 3, a substantially airtight seal is maintained between cylinder 17 and inlet 18.

Along the outer periphery of cylinder 17 are the plurality of apertures 17c. Air issuing from apertures 17c applies a force against tape medium 15. As the speed of the tape medium 15 increases and decreases the forces produced from the respective acceleration and deceleration move the tape medium 15 against and away from the air cushion between the tape medium 15 and the cylinder 17 surface.

The effect of changing tape speed can in prior art bearings result in a seal between the flanges 20, 21 and the edge of the tape medium 15. The net effect on the takeup reel 11 and supported tape medium 15 can be observed with respect to FIGS. 5 and 6.

Turning now to FIGS. 4 and 6, there is shown a partially wound takeup reel 11. The section 5—5 of FIG. 6 shows the layers of tape medium 15 on the core 11a of reel 11. The layers are staggered, which interferes with the tape payout during a rewind operation occurring during normal data process operations. To avoid the resulting difficulty associated with an air seal, means are provided to release the air seal.

Referring once again to FIG. 3, there are shown means comprising an undercut annular groove 25, 26 on each flange which partially intersects the cylindrical surface 17. The undercuts have a width 1/16" or less, extending only slightly into the cylinder 17 surface. The undercuts effectively provide an air passage between the air cushion which exists between the cylinder 17 and the tape 15. The tape medium 15 cuts across the undercuts 25, 26 upon entry and exit from the air bearing. The undercuts 25, 26 are believed to assist in reducing the formation of seals between cylinder 17 and the tape medium 15. A noticeable decrease in the air flow and air pressure which occurs in prior art air bearings during an air seal situation which created fluttering of the tape is avoided with the air bearing of FIG. 3. Further, the tape medium 15 layers are uniform as shown in FIG. 5. Each tape medium 15 layer has edges which lie in the plane of the edges of the remaining layers, thereby facilitating the paying out of tape material in response to a direction reversal of the reel 11. The undercuts 25, 26 also permit a curved tape to wrap the air bearing surface without forming a conical profile.

TECHNICAL IMPROVEMENT

Air bearing is provided which prevents air seals from forming with edges of the tape during acceleration and deceleration of the tape.

Thus, there has been described an air bearing which includes means for releasing an air seal between a tape medium 15 and cylinder 17 by providing an air channel between the cylinder 17 circumferential surface and tape medium 15. Those skilled in the art will recognize yet other embodiments defined more particularly by the claims which follow.

What is claimed is:

1. An air bearing device for forming an air cushion with a magnetic tape, said magnetic tape being tensioned to move across said air cushion onto first and second reels comprising:
   a cylinder connected at one end to a supply of air, said cylinder over a portion thereof including a plurality of apertures for discharging air against said magnetic tape; and
   first and second flanges terminating each end of said cylinder, each of said flanges including an annular groove also extending into the surface of said cylinder, said grooves providing an air release between said tensioned medium and said cylinder surface reducing fluttering of said tape and avoiding uneven layers of said tape from accumulating on said reels.

2. In an air bearing device for forming an air cushion with a tensioned magnetic tape medium, said magnetic tape medium being tensioned with first and second lateral edges between flanges on a cylinder which includes apertures for directing air against said magnetic tape medium, the improvement comprising:
   an annular groove of approximately circular cross-section in at least one of said flanges, said annular groove positioned adjacent said cylinder and extending into the surface of said cylinder for releasing air between said cylinder and magnetic tape medium.

3. The air bearing device of claim 2 wherein said annular groove comprises an undercut circular groove having parallel edges, one edge of the groove terminating at said cylindrical surface, the remaining edge on an adjacent flange, said medium surface lying between said groove edges whereby air is conveyed by said groove edges from the area bounded by said magnetic tape medium and cylinder to an opposite side of said magnetic tape medium.

* * * * *